Oct. 3, 1950  R. O. HEINEMANN  2,524,289
CURRENT COLLECTOR
Filed Jan. 12, 1946
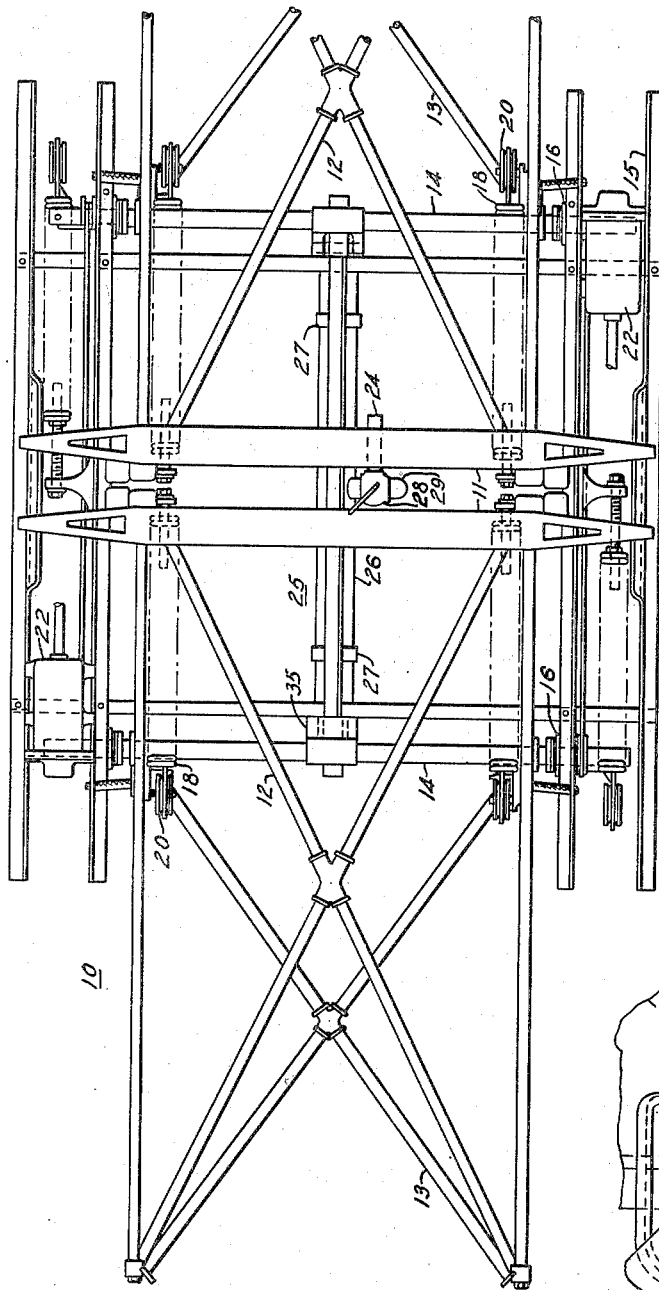
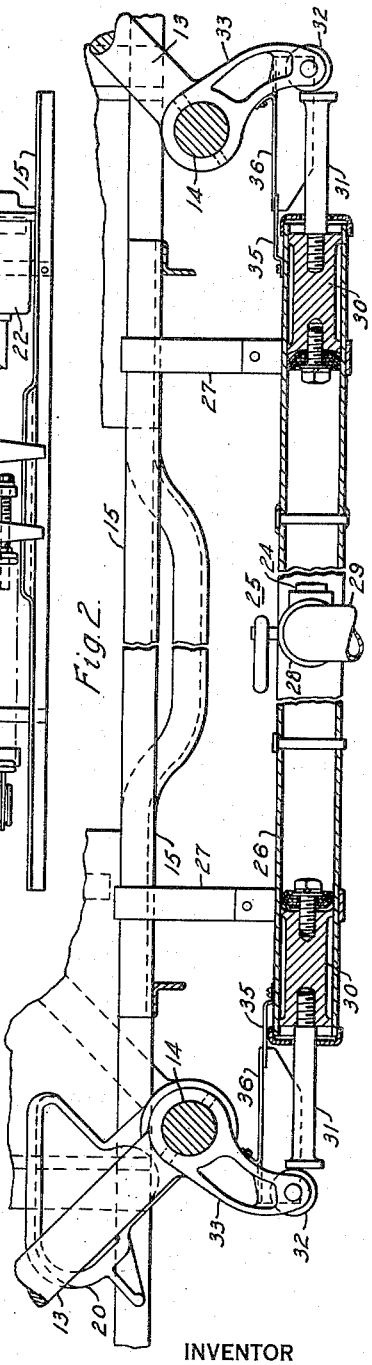
WITNESSES:
N. F. Susser
F. V. Giolma
INVENTOR
Robert O. Heinemann.
BY
L. W. Crawford
ATTORNEY Patented Oct. 3, 1950

2,524,289

UNITED STATES PATENT OFFICE 2,524,289

CURRENT COLLECTOR

Robert O. Heinemann, Pittsburgh, Pa., assignor to Westinghouse Electric Corporation, East Pittsburgh, Pa., a corporation of Pennsylvania Application January 12, 1946, Serial No. 640,843

4 Claims. (Cl. 191—67)

My invention relates, generally, to current collectors, and it has reference, in particular, to current collectors of the pantograph type.

Generally stated, it is an object of my invention to provide an improved current collector which is simple and inexpensive to manufacture, and which is reliable and efficient in operation.

More specifically, it is an object of my invention to provide a booster which may be readily operated to assist the normal raising springs of a current collector of the pantograph type in order to increase the contact pressure or to compensate for the weight of ice formed on the pantograph shoe and frame.

Another object of my invention is to provide an equalized booster for a current collector of the pantograph type.

Yet another object of my invention is to provide a booster of the character described having a substantially constant operating force throughout its operating range.

Still another object of my invention is to provide a resilient pantograph booster which is effective throughout a wide range of pantograph operating positions.

It is also an object of my invention to provide for remotely controlling the pressure of a pantograph shoe on a trolley conductor.

Other objects will, in part, be obvious and will, in part, be explained hereinafter.

In practicing my invention in one of its forms, a single elongated cylinder is provided having oppositely acting pistons therein which actuate levers attached to the operating shafts of the pantograph for increasing the raising force thereof. Air is admitted to the cylinder intermediate the pistons for increasing the raising force to increase the contact pressure or to compensate for additional weight caused by the formation of ice on the pantograph and shoes. The booster cylinder is easily rendered inoperative by venting it to the air.

For a more complete understanding of the nature and scope of my invention, reference may be made to the following detailed description, which may be studied in connection with the accompanying drawing, in which:

Figure 1 is a partial plan view of a current collector of the pantograph type shown in the lowered position and which embodies the invention in one of its forms; and Fig. 2 is an enlarged partial side elevational view of the current collector of Fig. 1 shown in the maximum raised or operating position.

Referring to Fig. 1 of the drawing, the reference numeral 10 may denote a current collector of the pantograph type, wherein a pair of current collector shoes 11 may be mounted on a pantograph structure comprising upper and lower frame members 12 and 13 which are connected in hinged relation. The lower frame members 12 may be mounted on shafts 14 which may be rotatably supported on a base structure 15 by means of bearings 16. Means such as the springs 18, which may be connected to the shaft 13 by means of cams 20, may be provided for rotating the shafts to raise the current collector shoes 11 to the operating position. The shoes may be lowered by means of fluid pressure means 22 operatively connected to the shafts 14 for operating them against the springs 18.

In order to provide for increasing the contact pressure, or for compensating for the additional weight of ice which may form on the pantograph frame and current collector shoes, and which tends to reduce the contact pressure between the shoes 11 and a trolley conductor (not shown), means such as the booster designated generally by the numeral 25 may be provided.

The booster 25 may comprise an elongated cylinder 26 which may be positioned intermediate the pantograph shafts 14, being for example, suspended from the base structure 15 by means of hangers 27. A valve 28 may be connected to the cylinder 26 intermediate the ends to provide a relatively large cross-sectional connection either to the main air reservoir of the vehicle through a conduit 29 of relatively large cross-section or to the air through a conduit 24.

Adjacent each end of the cylinder 26 pistons 30 may be provided, as shown in Fig. 2, having piston rods 31 for engaging rollers 32 on levers 33 which may be secured to the pantograph shafts 14 for rotating the shafts in the raising direction to assist the raising spring 18. The pistons 30 and levers 33 may be so arranged that the pistons are free to move in either direction or "float" in the normal operating position of the pantograph collector. Accordingly, the pistons may move to exert a substantially constant booster force on the pantograph structure throughout the operating range. Stationary shields 35 may be secured adjacent the ends of the cylinder 26 for cooperating with shields 36 mounted on the levers 33 to prevent the formation of ice from interfering with operation of the piston rods 31.

By providing a substantially unrestricted path between the main reservoir and the booster cylinder, through the conduit 29, air may readily flow between the reservoir and the cylinder, which prevents appreciable variations in pressure in the booster cylinder due to movement of the pistons 30 which results from movement of the pantograph structure. Thus, an almost constant force is applied by the pistons to the pantograph structure. During tests the following values of wire pressure were obtained for different operating positions of the pantograph shoes.

| Height of Shoes Above Rail | Values of Wire Pressure With Springs and Booster Cylinder |
|---|---|
| | Pounds |
| 22' 0" | 37 |
| 20' 1" | 34 |
| 19' 2" | 33 |
| 18' 3" | 32 |
| 17' 1" | 32 |
| 16' 4" | 32 |
| 16' 0" | 38 |

During operation the pantograph shafts rotate to accommodate changes in the height of the wire, and the pistons move more or less freely back and forth in the booster cylinder. Depending on the pressure at which air is admitted to the cylinder, both pistons are actuated simultaneously in opposite directions and apply substantially equal and opposite forces to their respective levers. This applies additional torques for overcoming the lowering effect caused by formation of ice on the pantograph frame and shoes. The torques applied to each of the main shafts are identical, so that no unbalanced forces are produced on the pantograph or any portion of the supporting frame or the pantograph structure. The pressure applied may be readily controlled from the cab of the locomotive by means of a hand valve or an electromagnetic valve, as desired.

From the above description and the accompanying drawing, it will be apparent that I have provided in a simple and effective manner for overcoming the effects of the formation of ice on pantograph shoes or frame structure. Increased wire pressure may be readily secured by the operator without moving from the cab which is effective throughout the normal operating range of the pantograph structure.

Since certain changes may be made in the above described construction, and different embodiments of the invention may be made without departing from the spirit or scope thereof, it is intended that all the matter contained in the above description and shown in the accompanying drawing, shall be considered as illustrative and not in a limiting sense.

I claim as my invention:

1. A pantograph collector comprising, a supporting frame, a pantograph frame, a pair of rotatable shafts supporting the pantograph frame on the supporting frame, means including lifting springs and fluid pressure lowering means operatively connected to rotate the shafts to respectively raise and lower the pantograph frame, and auxiliary fluid pressure means operable to actuate the shafts throughout the normal operating range of pantograph frame to compensate for the weight of ice on said pantograph frame.

2. A pantograph collector comprising, a supporting frame, a pantograph frame, a pair of spaced apart shafts supporting the pantograph frame relative to said supporting frame, spring means and fluid presure means operatively connected to the shafts to respectively raise and lower the pantograph frame, and auxiliary means for increasing the operating pressure of the collector including a common fluid pressure booster cylinder having opositely acting pistons therein operatively connected to actuate the shafts in opposite directions.

3. In a pantograph current collector, a pantograph frame mounted on spaced apart rotatable shafts spring-actuated operating means for raising and fluid pressure operating means for lowering the pantograph frame, an auxiliary air cylinder positioned intermediate the shafts having a movable booster piston adjacent each end with a booster piston rod projecting from the cylinder, a lever on each of the shafts arranged to be actuated by the booster piston rod to increase the upward pressure of the pantograph frame so as to compensate for an ice load on the frame, and a guard mounted on the lever to shield the piston rod.

4. In combination with a pantograph current collector having a pantograph frame mounted on spaced shafts on a support frame and provided with principal actuating means for actuating the shafts to raise and lower the pantograph frame auxiliary actuating means comprising, a dependent lever secured to each of the shafts intermediate its ends having a roller adjacent the free end, an elongated cylinder supported from the support frame in alignment with said levers, a pair of opposed pistons movably positioned in the cylinder adjacent the ends and having piston rods engaging the lever rollers, and means supplying fluid pressure to the cylinder intermediate the pistons through a substantially unrestricted passage to maintain substantially constant pressure within the cylinder.

ROBERT O. HEINEMANN.

REFERENCES CITED

The following references are of record in the file of this patent:

UNITED STATES PATENTS

| Number | Name | Date |
|---|---|---|
| 1,461,988 | Spikes | July 17, 1923 |
| 1,528,079 | Schaake | Mar. 3, 1925 |
| 1,671,485 | Pukerud | May 29, 1928 |